2,840,452
RECOVERY OF URANIUM FROM PITCHBLENDE

Archie E. Ruehle, Kirkwood, Mo., assignor to the United States of America as represented by the United States Atomic Energy Commission No Drawing. Application June 12, 1951
Serial No. 231,263

10 Claims. (Cl. 23—14.5)

This invention deals with the recovery of uranium from pitchblende and in particular with the separation and decontamination of uranium from molybdenum values.

When acid solutions containing uranyl nitrate, as they are obtained in the treatment of pitchblende ores with a nitric acid-containing acidic medium, are contacted with ether for the purpose of extracting the uranium values, complex molybdenum compounds, such as silicomolybdic acid and phosphomolybdic acid, are coextracted with the uranium and also again back-extracted from the ether with the uranium. This phenomenon represents a problem in the recovery of uranium from pitchblende. A great many processes have been tested to eliminate this difficulty; however, only a very few methods have been found suitable. One of the processes satisfactory for the purpose described above is the process of this invention.

It is thus an object of this invention to provide a process for extracting uranium values from nitric acid aqueous solutions with an ether in which coextraction of molybdenum values is avoided.

It is another object of this invention to provide an extraction process for uranium values from nitric acid aqueous solutions by which the uranium salt is obtained in a high degree of purity.

It has been found that polyhydric alcohols form complexes with molybdenum which are preferentially water-soluble and are taken up by the ether extractant from the aqueous solution to a very minor degree only. This fact is utilized in the process of this invention.

The preferred embodiment of the process of this invention comprises the steps of digesting pitchblende ore in a nitric acid-containing acid medium, separating the solution obtained from a remaining residue, adjusting the concentration of free nitric acid to between 0.5 and 2 N, adding a polyhydric alcohol, such as mannitol, sorbitol or a mixture thereof, preferably in a quantity several times that of the molybdenum present calculated as molybdenum oxide, $MoO_3$, and contacting the solution thus obtained with a substantially water-immiscible ether, for instance diethyl ether; the ether extract phase containing the uranium is then separated from the aqueous phase containing the molybdenum complex. By this procedure, in one instance, the molybdenum content in the ether phase was as low as 50 p. p. m. of uranium. This quantity was then furthermore decreased to 5 p. p. m. by washing the separated ether phase with water.

The neutralization of the free nitric acid for the purpose of reducing its concentration to the value between 0.5 and 2 N was preferably carried out by the addition of lime; however, other suitable alkalis may be used as well.

The separation by extraction may be furthermore increased by the addition of a salting-out agent, preferably a water-soluble nitrate such as alkali metal or alkaline earth metal nitrate; calcium nitrate has been found especially satisfactory for this purpose.

The extraction is preferably carried out at room temperature or at only slightly elevated temperature, because at higher temperatures decomposition of the polyhydric alcohol and a formation of ether-insoluble uranium oxalate take place.

In the following, an example is given for the purpose of illustrating one embodiment of the invention without the intention to limit the scope of the invention to the details given therein.

Example

To each of a series of 50-ml. portions of a pitchblende digest liquor a different quantity of mannitol was added. After fifteen minutes stirring at room temperature each portion was extracted with four successive 100-ml. portions of acidulated ether. The combined unwashed extracts from each portion were analyzed for uranium and molybdenum with the results shown in the table.

| Sample No. | 1 | 2 | 3 | 4 | 5 |
|---|---|---|---|---|---|
| Mannitol used, g | 0 | 0.025 | 0.25 | 0.63 | 1.00 |
| $MoO_3$, mg | 8.62 | 7.45 | 2.16 | 0.71 | 0.29 |
| U, g | 7.85 | 7.85 | 7.85 | 7.85 | 7.85 |
| $\frac{MoO_3}{U}$ in ether, p. p. m | 1,098 | 950 | 275 | 90 | 37 |

This table shows that the addition of mannitol greatly reduces the coextraction of molybdenum values and thus improves the efficiency of separation. Equally good results were obtained with sorbitol and a mixture of sorbitol and mannitol.

It will be understood that this invention is not to be limited to the details given herein but that it may be modified within the scope of the appended claims.

What is claimed is:

1. The process of recovering uranium from pitchblende ore, which comprises digesting pitchblende ore in an acidic medium containing nitric acid, separating the digest liquor from undissolved material, reducing the acidity of the liquor to a value between 0.5 and 2 N nitric acid, adding a polyhydric alcohol selected from the group consisting of mannitol, sorbitol and mixtures of mannitol and sorbitol in an amount at least several times the weight of molybdenum present in the aqueous solution, contacting the resulting solution with a substantially water-immiscible ether, and separating an ether extract phase containing uranyl nitrate from an aqueous phase containing a molybdenum complex of said polyhydric alcohol.

2. The process of claim 1 wherein the polyhydric alcohol is mannitol.

3. The process of claim 1 wherein the polyhydric alcohol is sorbitol.

4. The process of claim 1 wherein a water-soluble nitrate is added as a salting-out agent to the aqueous solution prior to extraction.

5. The process of claim 4 wherein the salting-out agent is calcium nitrate.

6. The process of claim 1 wherein the extraction is carried out at room temperature.

7. The process of claim 1 wherein the acid concentration is adjusted by the addition of lime.

8. The process of claim 1 wherein the ether is acidulated diethyl ether.

9. The process of claim 1 wherein the separated ether extract phase is washed with water for the purpose of further molybdenum removal.

10. The process of recovering uranium from pitchblende ore, which comprises digesting pitchblende ore with an acidic medium containing nitric acid, separating the digest liquor from undissolved material, adding lime to reduce the acidity of said liquor to a value between 0.5 and 2 N, adding calcium nitrate as a salting-out agent, adding mannitol in a quantity several times the weight of the molybdenum present expressed as $MoO_3$, contacting the resultant solution with acidulated diethyl ether, separating an ether extract phase from an aqueous phase, and washing said ether extract phase with water.

No references cited.